Figure 1:
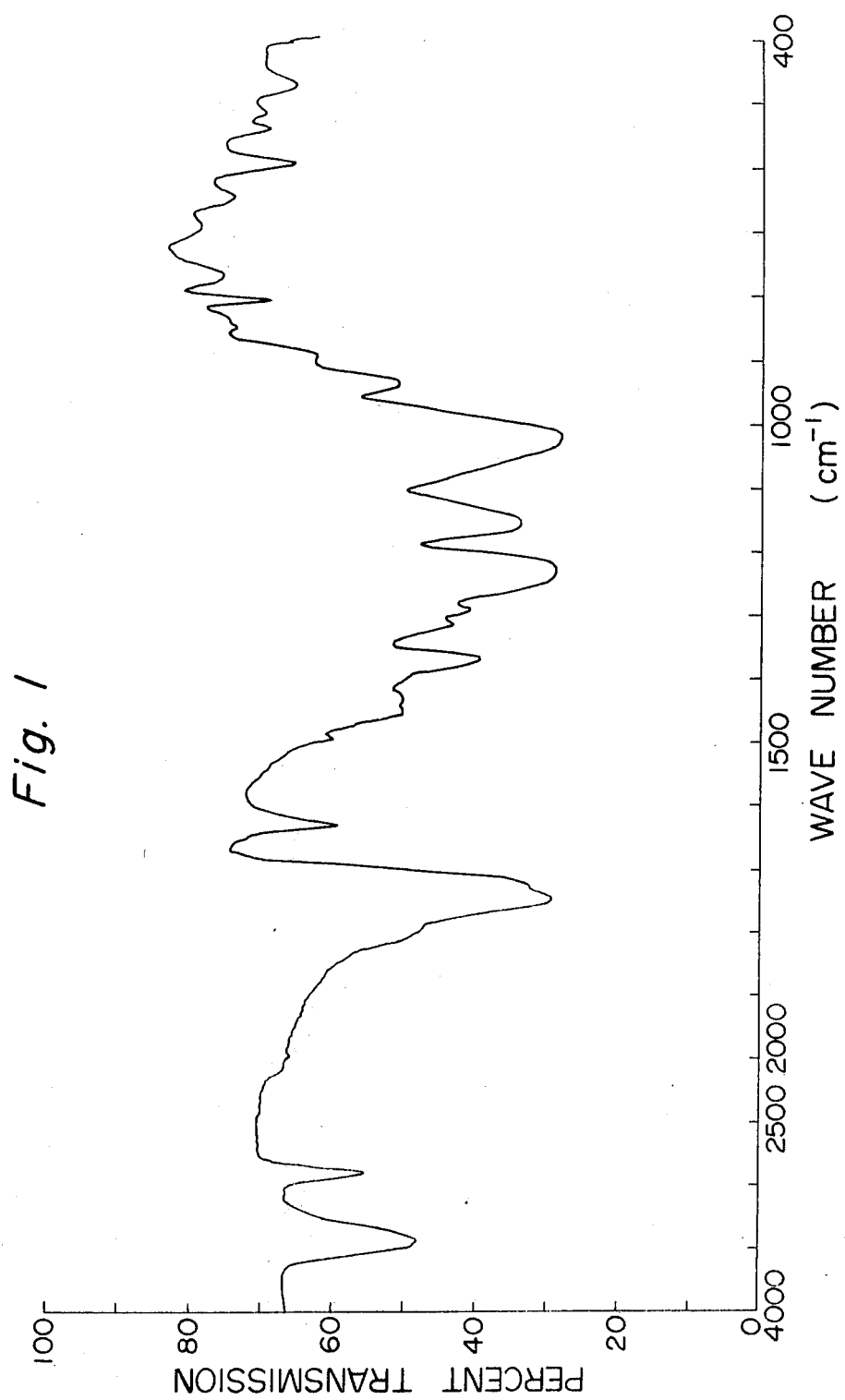

United States Patent

Hokkoku et al.

[11] 4,032,488
[45] June 28, 1977

[54] DEXTRAN ESTER-OLEFIN COMPOUND COPOLYMER AND PROCESS FOR PREPARING SAME

[75] Inventors: Shusaburo Hokkoku, Gifu; Yasuhiko Onishi, Inazawa, both of Japan

[73] Assignee: Meito Sangyo Kabushiki Kaisha, Nagoya, Japan

[22] Filed: Oct. 3, 1975

[21] Appl. No.: 619,178

[52] U.S. Cl. .............. 260/17.4 GC; 260/17.4 SG; 351/160
[51] Int. Cl.² .......................................... C08L 5/02
[58] Field of Search ............ 260/17.4 GC, 17.4 SG, 260/234 D; 351/160, 174; 536/112, 115

[56] References Cited

UNITED STATES PATENTS

| | | | |
|---|---|---|---|
| 2,868,781 | 1/1959 | Gaertner et al. | 536/112 |
| 3,332,897 | 7/1967 | Ray-Chaudhuri | 260/17.4 |
| 3,826,767 | 7/1974 | Hoover et al. | 260/17.4 |
| R23,443 | 12/1951 | Lolkema | 536/115 |

*Primary Examiner*—Edward M. Woodberry
*Attorney, Agent, or Firm*—Sherman & Shalloway

[57] ABSTRACT

A dextran ester-olefin compound copolymer comprising a unit derived from a dextran ester of the following formula (1)

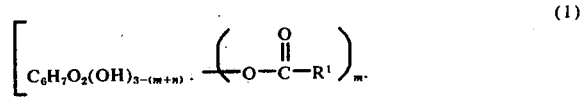
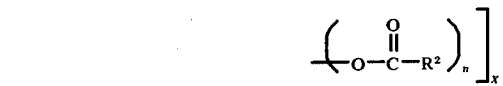

(1)

and a unit derived from a polymerizable olefin compound of the following formula (2)

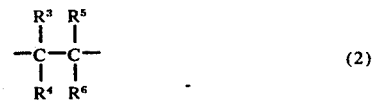

(2)

($R^1$, $R^2$, $R^3$, $R^4$, $R^5$ and $R^6$ are defined in claim 1); a process for preparing the same and a shaped article made therefrom.

8 Claims, 3 Drawing Figures

DEXTRAN ESTER-OLEFIN COMPOUND COPOLYMER AND PROCESS FOR PREPARING SAME

This invention relates to a new dextran ester-olefin compound copolymer, which finds wide utility in such fields as contact lenses, artificial viscera or parts thereof, denture and other shaped articles; as well as a process for preparing such a copolymer. In addition, the invention relates to dextran esters, which can not only be used for coating materials, films, etc., but are also useful as intermediates for the aforesaid new copolymer and other compounds; as well as a process for preparing such dextran esters.

Dextran saturated fatty acid esters, e.g., dextran acetate, dextran stearate, etc., that are obtained by reacting dextran with a saturated fatty acid, e.g., acetic acid, stearic acid, etc., are known (see U.S. Pat. Nos. 2,344,190 and 2,954,372). Again, dextran unsaturated fatty acid ester, e.g., dextran maleate that is obtained by reacting dextran with an unsaturated fatty acid, e.g., maleic acid, is also known [see Giorn. Biochim., 10, 373 – 9 (1961)]. The former dextran esters are known to be useful for such purposes as, for example, the resinous component of coating materials such as paints and lacquers and of protective hand creams. On the other hand, it is disclosed that when sulfuric acid ester was prepared using the latter dextran ester as intermediates, such medical activities as clarifying activity or anticoagulant activity was not exhibited at all.

However, the dextran esters derived from dextran and the two acids of the unsaturated and saturated acids have not been known heretofore.

The graft polymers derived from dextran and such polymerizable olefin compounds as methyl methacrylate and useful for such purposes as contact lenses, artifical viscera, etc., are also known along with the process for their preparation (see West German Laid-Open Pat. No. 2,334,530).

Our research endeavors were carried out to provide a resin having properties which are superior even to the resin disclosed in the foregoing West German Laid-Open Pat. No. 2,334,530 and, as a consequence, we discovered that it was readily possible to prepare a new dextran ester-olefin compound copolymer derived from a dextran ester, preferably a mixed acid ester of dextran derived from dextran and an unsaturated acid and a saturated acid, and a polymerizable olefin compound.

It was further found that this new copolymer, when used, say, for contact lenses and other purposes, possessed such desirable and superior properties as outstandingly high hardness, high softening point and other improved physical properties, as well as improved acid resistance and improvements in its other chemical properties.

We also found that a shaped article of desired configuration could be obtained in a single operation by polymerizing this new copolymer in a mold in the presence or absence of a polymerization initiator.

In addition, it was found that this new copolymer conveniently possesses a thermoplasticity of a degree such as to make possible its melt-shaping notwithstanding its possession of the ability to form a network structure of considerably high degree as compared with the conventional graft polymer obtained from dextran and a polymerizable olefin compound. Furthermore, it was found that the interaction of the invention copolymer with, for example, the tissues of living body was exceedingly small, of a degree so small as to be ignorable with the consequence that it was especially suitable in making such shaped articles as contact lenses, artificial viscera or parts thereof, dentures and denturebase.

It is therefore an object of this invention to provide a new dextran ester-olefin compound copolymer possessing the various excellent properties such as above described and a process for preparing such a new copolymer.

Another object of this invention is to provide a new mixed acid ester of dextran, which not only is useful as an intermediate for preparing the foregoing copolymer but also is useful for preparing coating materials and films; as well as a process for preparing such a dextran ester.

A further object of the invention is to provide shaped articles of the foregoing copolymer and a process for producing same.

Other objects and advantages of the present invention will become apparent from the following description.

The new dextran ester-olefin compound copolymer is comprised of a unit derived from a dextran ester of the following formula (1)

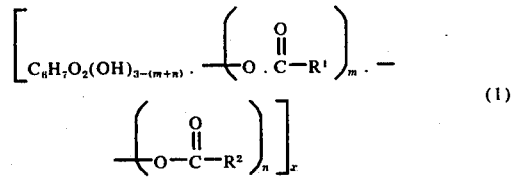

wherein $R^1$ is a $C_2$–$C_{18}$ organic radical having the

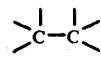

bond derived from the $>C = C<$ bond of an unsaturated acid, $R^2$ is a $C_1 - C_{18}$ alkyl radical, $m$ is a positive number having a value of $O < m \leq 3$, $n$ is a positive number having a value of $O \leq n < 3$, with the proviso that $m + n \leq 3$, and $x$ is a positive number having a value of 5 or more; and a unit derived from a polymerizable olefin compound of the following formula (2)

wherein $R^3$, $R^4$ and $R^5$ are each selected from the group consisting of hydrogen and $CH_3$ and $R^6$ is a member of the group consisting of

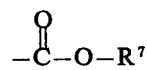

[where $R^7$ is a member of the class consisting of hydrogen, $C_1 - C_{18}$ alkyl radicals, cyclohexyl radical, lower alkyl-substituted, e.g. $C_1 - C_4$ lower alkyl-substituted cyclohexyl radical, $C_1 - C_8$, preferably $C_1 - C_4$, hydroxyalkyl radicals, $-N(R^{10})_2$ where the two $R^{10}$'s which may be the same or different, are either hydrogen or a $C_1 - C_4$ alkyl radical, $C_1 - C_8$, preferably $C_1 - C_4$, aminoalkyl radicals, $C_1 - C_8$ dialkylaminoalkyl radicals, glycidyl radical, tetrahydrofuran radical, lower alkyl substituted, e.g., $C_1 - C_4$ lower alkyl-substituted tetrahydrofuran radical, benzyl radical and the $\{CH_2CH_2O\}_y CH_2CH_2OH$ radical where $y$ is a positive integer from 1 to 10];

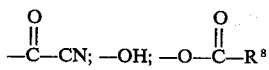

where $R^8$ is a $C_1 - C_8$, preferably $C_2 - C_4$, alkyl radical;

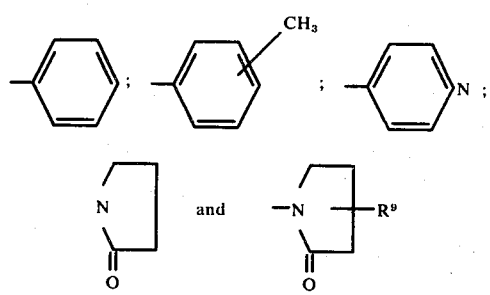

where $R^9$ is a lower alkyl radical, e.g., $C_1 - C_4$ lower alkyl radical.

The unsaturated acids and acid anhydrides or acid halides thereof, from which the aforementioned $C_2 - C_{12}$ organic radical $R^1$ is derived, include the $C_3 - C_{19}$ unsaturated acids and acid anhydrides or acid halides thereof. As specific examples of such unsaturated acids, there can be mentioned such alphabeta unsaturated acids as acrylic acid, methacrylic acid, crotonic acid, isocrotonic acid beta, beta-dimethylacrylic acid, angelic acid, tiglic acid, and such unsaturated acids as maleic acid, fumaric acid, citraconic acid, mesaconic acid, itaconic acid, aconitic acid, and oleic acid. On the other hand, as the acid anhydrides or acid halides, included are the anhydrides or halides (e.g. acid chloride) of the foregoing unsaturated acids. The $C_2 - C_6$ organic radicals are preferred as the radical $R^1$. Hence, the $C_3 - C_7$ acids, and especially the aliphatic unsaturated acids, are preferred as the foregoing unsaturated acids. These unsaturated acids and the acid anhydrides or acid halides thereof can be used either singly or in combination of two or more thereof. On the other hand, the saturated acids and the acid anhydrides or acid halides thereof, from which the aforementioned radical $R^2$ is derived, include the $C_2 - C_{19}$ saturated acids and the acid anhydrides or acid halides thereof. As specific examples of such saturated acids, mention can be made of such saturated acids as formic acid, acetic acid, propionic acid, butyric acid, palmitic acid and stearic acid. On the other hand, as the acid anhydrides or acid halides, included are the anhydrides or acid halides (e.g. acid chloride) of the above acids. These saturated acids and the acid anhydrides or acid halides thereof can be used either singly or in combination of two or more thereof.

As the polymerizable olefin compound from which the unit expressed by the foregoing formula (2) is derived, there can be mentioned the alpha, beta-unsaturated acids such, for example, as acrylic acid and methacrylic acid; the $C_1 - C_{18}$ alkyl esters such, for example, as the methyl, ethyl, propyl, butyl, decyl, lauryl and stearyl esters of these alpha, beta-unsaturated acids; cyclohexyl ester or lower alkyl-substituted cyclohexyl ester, for example, 2-ethylcyclohexyl ester, of the foregoing alpha, beta-unsaturated acids; the $C_1 - C_8$ hydroxyalkyl esters of the alpha, beta-unsaturated acids such as the 2-hydroxyethyl esters, 2-hydroxypropyl ester and 2-hydroxybutyl esters of the foregoing alpha, beta-unsaturated acids; the amides or alkyl amides of the foregoing alpha, beta-unsaturated acids such as acrylamide, methacrylamide, acryl- or methacryldimethylamide and acryl- or methacryldiethylamide; the $C_1 - C_8$ aminoalkyl esters such as the aminomethyl, aminoethyl and aminobutyl esters of the aforesaid alpha, beta-unsaturated acids; the $C_1 - C_8$ dialkylaminoalkyl ester such as the dimethylaminoethyl, diethylaminoethyl, dimethylaminobutyl and diethylaminobutyl esters of the aforesaid alpha, beta-unsaturated acids; the glycidyl esters of the foregoing alpha, beta-unsaturated acids; the tetrahydrofurfuryl esters of the aforesaid alpha, beta-unsaturated acids; the benzyl esters of the foregoing alpha, beta-unsaturated acids; the polyethylene glycol monoesters such as the diethylene glycol, triethylene glycol and tetraethylene glycol monoesters of the aforesaid alpha, beta-unsaturated acids; the nitriles of the foregoing alpha, beta-unsaturated acids such as acrylonitrile and methacrylonitrile; vinyl alcohol, methylvinyl alcohol and dimethylvinyl alcohol; the $C_1 - C_8$ alkyl esters of vinyl alcohol or the foregoing methyl-substituted vinyl alcohols such as vinyl acetate, vinyl propionate and vinyl butylate; styrene; alpha-methylstyrene and vinyl toluene; vinylpyridine; vinylpyrrolidone; and vinylmethylpyrrolidone.

These polymerizable olefin compounds can be used either singly or in combination of two or more thereof.

The above-described dextran ester-olefin compound copolymer of this invention is insoluble in a wide range of the conventional organic solvents such, for example, as the alcohols, ketones, ethers, esters, aromatic hydrocarbons, organic acids and organic bases. Hence, its molecular weight cannot be determined by the usual methods of measuring the molecular weight of the high-molecular-weight compounds. The invention copolymer has a Rockwell hardness (M scale) of above about 20, usually above about 25, and frequently as much as about 150. Again, the invention copolymer is insoluble at 50° C. in chloroform, acetone, dimethylformamide, dimethyl sulfoxide, dioxane, benzene and pyridine.

The proportion of the formula (1) units to the formula (2) units in the new copolymer of this invention can be suitably chosen. For example, the usual practice is to use at least about 50, usually about 50 – about 10,000, of the formula (2) units per 100 formula (1) units.

The above-described dextran ester-olefin compound copolymer of this invention can be prepared by reacting in the presence of absence or a polymerization initiator a dextran ester of the following formula (1')

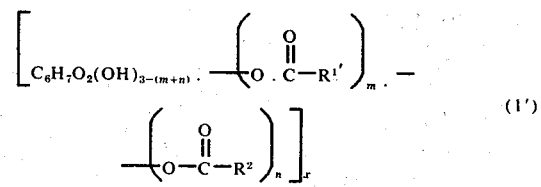

(1')

where $R^{1'}$ is a $C_2-C_{18}$ organic radical having the $>C=C<$ bond, $R^2$ is a $C_1-C_{18}$ alkyl radical, $m$ is a positive number having a value of $0<m\leq 3$, $n$ is a positive number having a value of $0 \leq n<3$, with the proviso that $m + n \leq 3$, and $x$ is a positive number having a value of 5 or more; with a polymerizable olefin compound of the following formula (2')

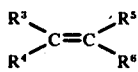  (2')

wherein $R^3$, $R^4$ and $R^5$ are each selected from the group consisting of hydrogen and $CH_3$, $R^6$ is a member of the group consisting of

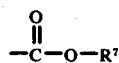

[where $R^7$ is a member of the class consisting of hydrogen, $C_1 - C_{18}$ alkyl radicals, cyclohexyl radical, lower alkyl-substituted cyclohexyl radical, $C_1 - C_8$ hydroxyalkyl radicals, $-N(R^{10})_2$ where the two $R^{10}$'s, which may be the same or different, are either hydrogen or a $C_1 - C_4$ alkyl radical, $C_1 - C_8$ aminoalkyl radicals, $C_1 - C_8$ dialkylaminoalkyl radicals, glycidyl radical, tetrahydrofuran radical, lower alkyl-substituted tetrahydrofuran radical, benzyl radical and the $-(CH_2CH_2)_yCH_2CH_2OH$ radical where $y$ is a positive integer of from 1 to 10];

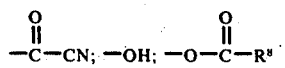

where $R^8$ is a $C_1 - C_8$ alkyl radical;

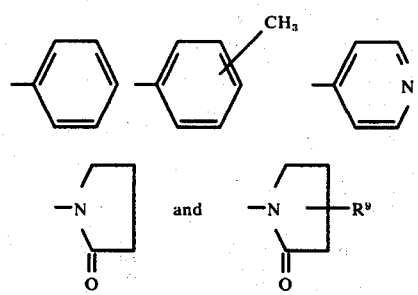

where $R^9$ is a lower alkyl radical.

Further, the starting dextran ester of the foregoing formula (1') can be prepared by the following process (A) or (B).

Process A.

The compound of formula (1') can be prepared by reacting dextran with either an unsaturated acid of the formula $HOOCR^{1'}$ where $R^{1'}$ is a $C_2 - C_{18}$ organic radical having the $>C=C<$ bond or said unsaturated acid and a saturated acid of the formula $HOOCR^2$ where $R^2$ is a $C_1 - C_{18}$ alkyl radical or an acid anhydride of said acid, in the presence of an acid catalyst.

Process B.

It is also possible to prepare the compound of formula (1') in the following manner. Dextran is reacted in a nonacidic liquid medium under basic conditions with either a compound selected from the group consisting of an unsaturated acid of the formula $HOOCR^{1'}$ where $R^{1'}$ is a $C_2-C_{18}$ organic radical having the $>C=C<$ bond and the acid anhydrides and acid halides thereof or said compound and a compound selected from the group consisting of a saturated acid of the formula $HOOCR^2$ where $R^2$ is a $C_1 - C_{18}$ alkyl radical and the acid anhydrides and acid halides thereof.

Of the compounds of the aforesaid formula (1'), the dextran esters having the following formula (1'') are compounds that have yet to be mentioned in the literature.

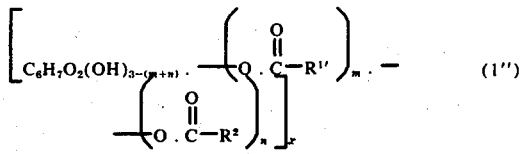  (1'')

wherein $R^{1'}$ is a $C_2 - C_{18}$ organic radical having the $>C = C<$ bond, $R^2$ is a $C_1 - C_{18}$ alkyl radical, $m$ is a positive number having a value of $0<m<3$, $n$ is a positive number having a value of $0<n<3$, with the proviso that $m + n \leq 3$, and $x$ is a positive number having a value of 5 or more. These compounds can be prepared by using in Process A the two components of said unsaturated acid and saturated acid or the acid anhydrides thereof, or by using in Process B a compound of the group consisting of said unsaturated acids and the derivatives thereof and a compound of the group consisting of said saturated acid and the derivatives thereof.

As specific examples of the unsaturated and saturated acids of the foregoing formulas $HOOCR^{1'}$ and $HOOCR^2$ or the acid anhydrides or acid halides of these acids to be used in the aforementioned Processes A and B, the same examples previously given in connection with formula (1) as unsaturated and saturated acids from which the radicals $R^1$ and $R^2$ of the formula (1) are derived and the acid anhydrides and acid halides thereof can be mentioned.

Process A can be carried out in the presence or absence of a solvent. Examples of usable solvents include dioxane and the aromatic hydrocarbons such as benzene, toluene and xylene. On the other hand, as the acid catalyst, preferably used are sulfuric acid, sulfoacetic acid, perchloric acid and trifluoroacetic anhydride.

As preferred modes of the Process A, i.e., the case where a mixed ester of a saturated acid and an unsaturated acid is prepared, there is a method which comprises reacting dextran with an unsaturated acid of the formula $HOOCR^{1'}$ where $R^{1'}$ is as above defined, and an anhydride of a saturated acid of the formula $HOOCR^2$, where $R^2$ is as above defined, in the presence of an acid catalyst selected from the group consisting of sulfuric acid, sulfoacetic acid and perchloric acid, as well as a method which comprises reacting dextran with an unsaturated acid of the formula $HOOCR^{1'}$, where $R^{1'}$ is as above defined, and a saturated acid of the formula $HOOCR^2$, where $R^2$ is as above defined, in the presence of trifluoroacetic anhydride and sulfuric acid.

On the other hand, the Process B is carried out in a nonacidic liquid medium under basic conditions. When the nonacidic liquid medium itself is a basic medium, such, for example, as pyridine, dimethylformamide, formamide, acetamide, quinoline or picoline, it is not especially necessary that an alkaline substance be copresent for achieving the basic conditions. However, when a nonacidic liquid medium such as dioxane and the aromatic hydrocarbons such as toluene, benzene and xylene are used, the reaction is carried out in the copresence of a suitable alkaline substance. As the alkaline substance for this purpose, the organic and inorganic bases can be used. For example, usable are such compounds as the alkali metal hydroxides, alkaline earth metal hydroxides, alkali metal carbonates, alkali metal salts of the $C_1 - C_8$ fatty acids such as acetic acid, formic acid and propionic acid, as well as the aforementioned basic media.

As preferred modes of practicing the Process B, the following modes can be given by way of illustration. A method which comprises reacting dextran with either an acid anhydride or acid halide of an unsaturated acid of the formula $HOOCR^{1'}$, where $R^{1'}$ is as above defined, or said acid anhydride or acid halide and an acid anhydride or acid halide of a saturated acid of the formula $HOOCR^2$, where $R^2$ is as above defined, in a basic medium such as hereinbefore indicated; a method comprising reacting dextran with an unsaturated acid of the formula $HOOCR^{1'}$, where $R^{1'}$ is as above defined, and an acid anhydride of a saturated acid of the formula $HOOCR^2$, where $R^2$ is as above defined, in the aforesaid aromatic hydrocarbon or dioxane medium in the presence of the aforementioned alkaline substance; and a method which comprises reacting dextran with an unsaturated acid of the formula $HOOCR^{1'}$, where $R^{1'}$ is as above defined, and an acid anhydride of a saturated acid of the formula $HOOCR^2$, where $R^2$ is as above defined, in dimethylformamide in the presence of one of the aforementioned alkaline substances, of which especially preferred is potassium acetate. In this case, especially preferred is a procedure consisting of first treating the dextran in, for example, an aqueous potassium acetate solution, drying the treated dextran and thereafter carryout the reaction, since by operating in this manner the reaction proceeds more smoothly.

In preparing the dextran ester of formula (1') it is preferred that the reaction be carried out without causing a split of the double bond of the unsaturated acid of the formula $HOOCR^{1'}$. The reaction can be carried out in the presence of a polymerization inhibitor, if necessary. As such polymerization inhibitor, there can be mentioned such compounds as hydroquinone and para methoxy phenol. The reaction is preferably carried out at as low a temperature as possible. In the case of the Process A, the reaction is preferably carried out at below about 40° C., and more preferably below about 35° C. It is usually carried out at room temperature, but may be also carried out under cooling, if desired. A temperature ranging between about 0° C. and about 40° C. can usually be employed. The reaction time can be suitably varied in the range of about ½ – 24 hours. In the case of Process B, a temperature ranging between about 20° C. and about 60° C. can be employed. Preferably, a temperature from about 60° C. to about 120° C. is employed for shortening the reaction time.

The starting dextran esters, which are obtained as above described, can be suitably chosen in accordance with the properties that are desired in the dextran ester-olefin compound copolymer of this invention. For instance, when it is desired to prepare a copolymer suitable for obtaining shaped articles having greater mechanical strengths such as flexural and tensile strengths, preferred is that whose $n$ in formula (1') (degree of esterification of the saturated acid) is of a larger value, for example, one in which the $n$ ranges between about 1.5 and 3. On the other hand, the value of $m$ affects the degree of cross-linking of the resulting copolymer and the wettability with respect to tear and humor of shaped article obtained from this copolymer. When the copolymer is to be used for contact lenses or viscera, consideration is given to the matter of achieving a balance between the mechanical strengths and the foregoing wettability, and the $n$ and $m$ values preferred in this case are those where about $1 \leq n \leq$ about 2.5 and about $0.1 \leq m \leq$ about 1.5. Of course, since these properties that are ascribable to the values of $m$ and $n$ mutually affect each other, these values cannot be decided unqualifiedly. However, the desirable values of $m$ and $n$ for the starting dextran ester can be readily determined experimentally in accordance with the intended use of the resulting copolymer.

As the polymerizable olefin compound of the aforementioned formula (2') to be reacted with the foregoing formula (1') dextran ester, the same examples previously given in connection with the formula (2) as polymerizable olefin compounds from which the unit of formula (2) is derived can be mentioned.

The invention dextran ester-olefin compound copolymer comprised of the formula units (1) and formula units (2) can be obtained by reacting a compound of the foregoing formula (1') with a compund of the foregoing formula (2') in the presence or absence of a polymerization initiator. The reaction can be carried out, for example, by such polymerization processes as solution, suspension, emulsion and bulk polymerization processes. The employment of the bulk polymerization process is especially preferred, since the shaped article of desired form can be obtained in a single operation in the mold in which it has been cast.

In the case where the solution polymerization process is to be employed, the dextran ester of formula (1') and the polymerizable olefin compound of formula (2') are first dissolved in a suitable solvent such, for example, as benzene, toluene, xylene, cresol, dioxane, tetrahydrofuran, cyclohexane, chloroform, dichlorethane, acetone, methyl ethyl ketone, cyclohexanone, dimethylformamide and dimethyl sulfoxide, in a polymerization reactor, after which the reaction is carried out in the presence of a solution polymerization initiator such, for example, as benzoyl peroxide, lauroyl peroxide, di-t-butylperoxyphthalate, azobisisobutyronitrile, phenylazoallylsulfonic acid and N-nitroso-N-acyl compounds. In this case the reaction is preferably carried out by heating the reactants for 1–24 hours at 50°–200° C. in preferably an atomosphere of an inert gas such as nitrogen.

The proportions in which the formula (1') dextran ester and the formula (2') polymerizable olefin compound are used can be suitably chosen in accordance with the end desired. While there is imposed no particular restriction as to the amount in which the solvent is used, in those cases where the viscosity of the reaction solution rises abnormally with the progress of the polymerization reaction, it is best to use the solvent in such an amount as to preclude such a possibility, since such a situation might cause the reaction to proceed nonuniformly. The use of the polymerization initiator in an amount of about 0.1% to about 1.5% by weight based on the total weight of the formula (1') dextran ester and the formula (2') polymerizable olefin compound will do.

After completion of the reaction, the product can be separated and collected by filtration or centrifugation followed by purification, if necessary, and thereafter drying under reduced pressure to obtain the intended copolymer. If desired, the intended product can be separated after completion of the reaction by such procedures as distilling off of the solvent or by adding a poor solvent for the copolymer, such, for example, as water, methanol or acetone, to the reaction product and collecting the intended product in the form of a precipitate.

When the suspension polymerization process in used, the formula (1') dextran ester and the formula (2') polymerizable olefin compound are dispersed in a poor solvent, preferably water, after which the reaction is carried out preferably in an atomsphere of an inert gas such as nitrogen with stirring. In this case, a stabilizer such, for example, as calcium carbonate, magnesium carbonate, alumina and gelatin can be added for facilitating the dispersion of the components as well as to ensure that the reaction proceeds smoothly. As the suspension polymerization initiator, a compound which is insoluble in water but soluble in the formula (2') polymerizable olefin compound, such as benzoyl peroxide, is preferably used. However, also usable are those compounds which are soluble in water but insoluble in the polymerizable olefin compound such, for example, as ammonium persulfate. Water is preferably used in an amount of about 3–10 fold by volume of the total amount of the formula (1') dextran ester and the formula (2') polymerizable olefin compound. On the other hand, the use of the stabilizer in an amount of not more than 1% by weight of the foregoing total and the polymerization initiator in an amount on the order of 0.1–1.5% by weight of the foregoing total will do. A reaction temperature of preferably about 40° to 90° C. is used, while the reaction time employed is usually on the order of 1–24 hours. After completion of the reaction, a granular product is separated followed by purification, if necessary, and thereafter dried to obtain the intended copolymer.

On the other hand, in the emulsion polymerization process the formula (1') dextran ester and the formula (2') polymerizable olefin compound are suspended in water and, after adding an emulsifier and a polymerization initiator, the reactants are reacted preferably in an atmosphere of an inert gas such as nitrogen with stirring. Water is used preferably in an amount about 2–5-fold by volume of the total amount of the formula (1') dextran ester and the formula (2') polymerizable olefin compound. On the other hand, as the usable emulsifier, included are the surfactants of the group consisting of the cationic, anionic and nonionic surfactants. The surfactant is preferably used in an amount of about 0.1–5% by weight of the total weight of the formula (1') dextran ester and the formula (2') polymerizable olefin compound. As the emulsion polymerization initiator, the water-soluble polymerization initiators such, for example, as the persulfates, percarbonates and hydrogen peroxide are preferably used in an amount of about 0.1–1.5% by weight of the foregoing total. The reaction is preferably carried out at a temperature of 20°–90° C. for a reaction time of about 1–24 hours. After completion of the reaction, either the product can be flocculated by adding an electrolyte such, for example, as sodium chloride, calcium chloride or sodium sulfate to the reaction solution, or the reaction solution can be introduced into an organic solvent such, for example, as methanol to form a precipitate, which is separated followed by purification, if necessary, and thereafter dried to obtain a powdery copolymer.

Further, when in accordance with a preferred mode of practicing the invention process the bulk polymerization technique is employed, the intended product can be readily obtained by either dissolving or swelling the formula (1') dextran ester in the formula (2') polymerizable olefin compound and then carrying out the reaction after adding a polymerization initiator. In this case the proportion in which the formula (1') dextran ester and the formula (2') polymerizable olefin compound are used can be suitably chosen in accordance with the end desired. Usable as the polymerization initiator in this process are, for example, benzoyl peroxide, lauroyl peroxide, di-t-butyroperoxyphthalate, azobisisobutyronitrile, phenylazoallylsulfonic acid and N-nitroso-N-acyl compounds. These polymerization initiators are preferably used in an amount of about 0.1–1.5% by weight based on the total weight of the formula (1') dextran ester and the formula (2') polymerizable olefin compound. The bulk polymerization reaction is carried out, if necessary, under an atmosphere of an inert gas such as nitrogen preferably at about 30°–60° C. for from several hours to several days, following which the reaction is best continued for a further period of about 1–10 hours at about 60°–110° C. If in carrying out the reaction a violent polymerization reaction occurs and bubbles are formed, the reaction time should be suitable prolonged by reducing the amount of the polymerization initiator used and/or by lowering the reaction temperature. If necessary, the reaction product can be further annealed at about 60°–90° C. for 2–24 hours. One of the important features of the invention process is that the dextran ester copolymer can be obtained by this bulk polymerization process. In all of the hereinbeforedescribed polymerization processes other than the bulk polymerization process the product is always obtained as powders or granules. Hence, it is impossible to obtain the product directly in the form of a shaped article such, for example, as sheets, rods etc., in the case of the polymerization processes other than the bulk polymerization process. On the other hand, since in the case of the bulk polymerization process, the formula (1') dextran ester and the formula (2') polymerizable olefin compound are placed from the outset in a mold and, after adding and dissolving therein a polymerization initiator, the reaction is carried out by heating the reactants, this process is extremely advantageous from the standpoint of efficiency and economy.

Needless to say, the powdery or granular products obtained by the aforementioned other processes can also be fabricated into a desired shaped article by processing the powdery or granular products by a suitable molding method such as pressing, injection, extrusion or other methods.

The dextran ester used in the bulk polymerization process must be one which dissolves in the polymerizable olefin compound or at least is swelled thereby. As this solubility varies in accordance with the class and content of the acid radical of the ester, these factors should be given consideration in preparing the dextran ester. For instance, of the herein-before-described methods of preparing the dextran ester, the Process B is especially preferred. Employment of the method of reacting the dextran with a saturated acid anhydride and an unsaturated acid in one of the previously indicated basic solvents, e.g., dimethylformamide, etc., in the presence or absence of one of the previously indicated alkaline substances such as potassium acetate, etc., is preferred. The employment of this method is an advantage, because a dextran ester of a quality especially suitable for use in the bulk polymerization process can be obtained in good yield.

While the various polymerization methods have been described hereinabove with particular reference to an embodiment of using a polymerization initiator, it should be understood that the polymerizations can also be performed in the absence with initiators, for example by heating or by irradiation of ultraviolet rays.

In carrying out the hereinbefore-described various polymerization processes, it is also possible to carry out the reaction in the copresence of a coloring agent and a plasticizer by adding these additives to, for example, the formula (2') polymerizable olefin compound before reacting it with the dextran ester thereby causing the incorporation in the resulting copolymer of these additives.

The invention dextran ester-olefin compound copolymers that have been prepared in the manner described above are difficultly soluble in such organic solvents as, for example, benzene, chloroform and acetone, which can dissolve the homopolymers of the starting formula (1') dextran ester and starting formula (2') polymerizable olefin compound. In the accompanying drawings are shown infrared spectra of the starting dextran ester of the hereinafter given Example 1 (FIG. 1) and the reaction product of this ester and methyl methacrylate (FIG. 2), as well as that of a methyl methacrylate polymer (FIG. 3).

The principal absorptions exhibited in the IR spectrum of dextran ester of FIG. 1 are as follows: (1) 1750 cm$^{-1}$: $\nu$C=O, 1020 and 1150 cm$^{-1}$: C—O—C symmetric and antisymmetric stretching vibrations; (2) 1370 cm$^{-1}$: $\delta$CH, 1230 cm$^{-1}$: $\nu$C—O, 1635 cm$^{-1}$: $\nu$C=C, 809 and 835 cm$^-$: C—H out-of-plane deformation vibrations of R—CH=CH$_2$ and

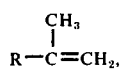

(4) 3450 cm$^{-1}$; $\nu$OH, 770 and 910 cm$^{-1}$: vibration of the pyranose ring, 852 cm$^{-1}$: $\delta$C$_1$—H.

Of these, group (1) derives from an organic acid ester, group (2), derives from especially an acetic acid ester, group (3) derives from acrylic and methacrylic radicals, and group (4) derives from dextran.

Figure 2:
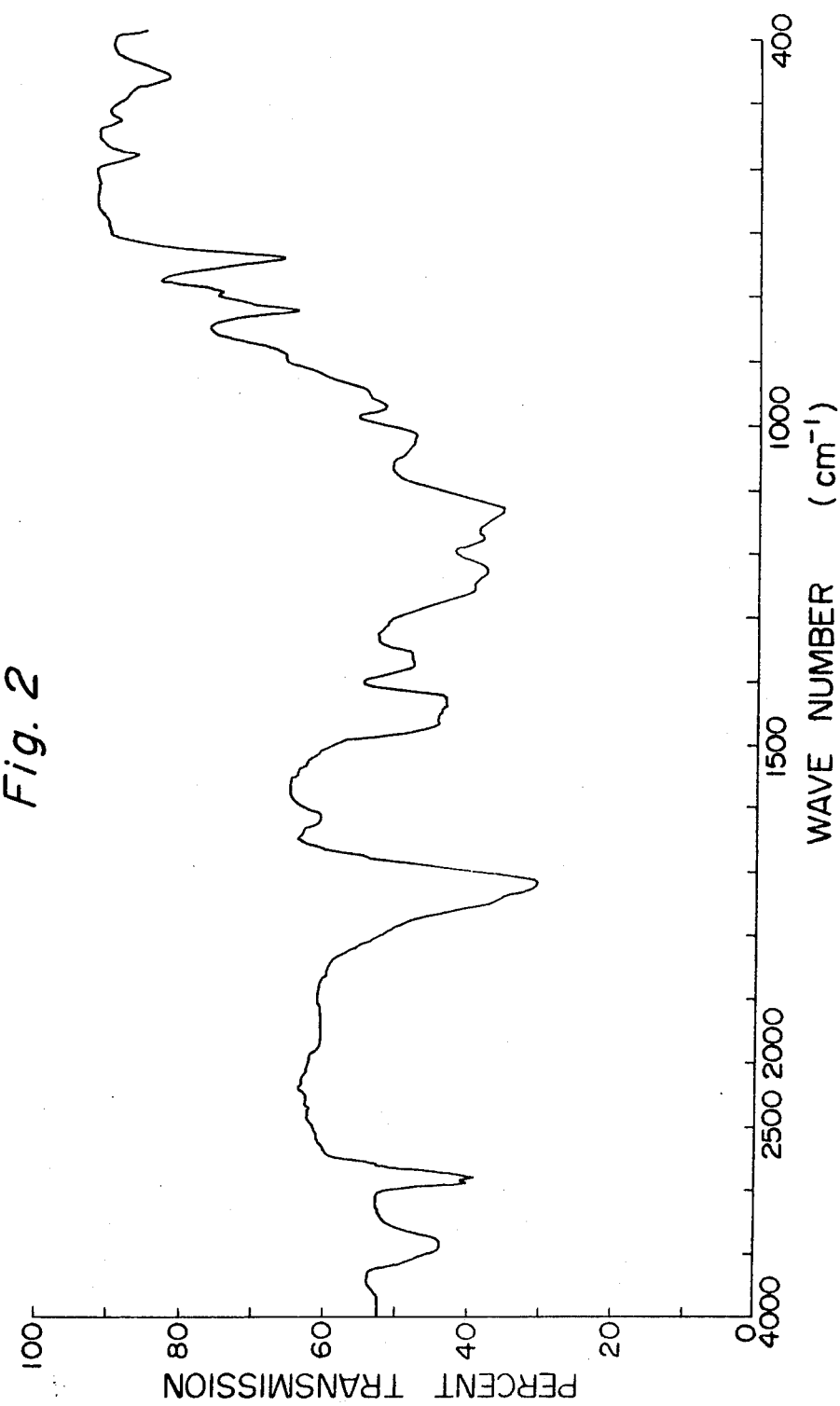
Figure 3:
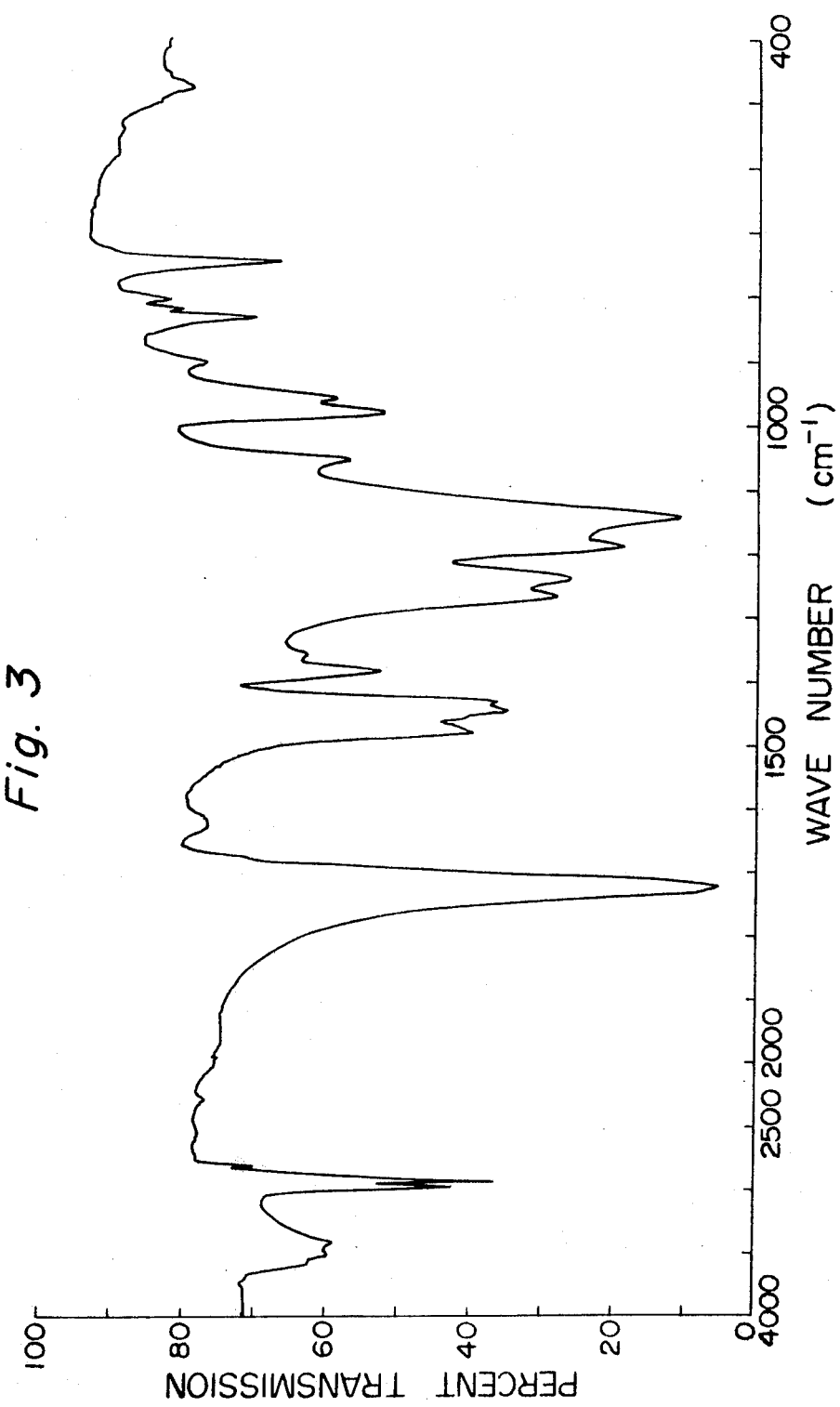

As is apparent from FIG. 2 of the accompanying drawings, the absorption ascribable to >C=C< seen in the IR spectrum of dextran ester (FIG. 1) is not seen in the IR spectrum of the reaction product. On the other hand, absorptions ascribable to the alpha-1,6-pyranose ring and >C=O or C—CH$_3$ are seen in this spectrum. Further, as hereinbefore indicated, the reaction product is insoluble in the common solvents for the dextran ester and methyl methacrylate polymer, which have been used as the starting materials, and expecially in acetone.

It is thus seen from the foregoing facts that the product obtained by the invention process is a copolymer containing the units of the aforementioned formulas (1) and (2). Since a variety of combinations of these units are possible, it is impossible to indicate the chemical structure of the invention product unqualifiedly. However, by way of illustration, there can be shown one having a structure such as follows:

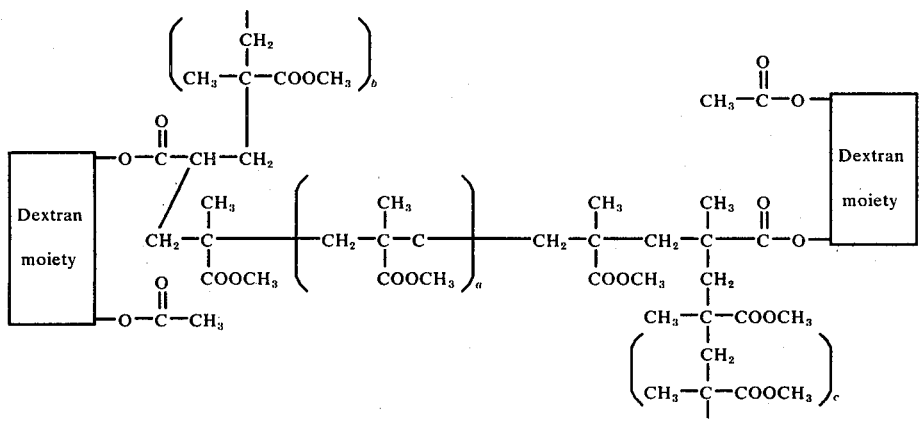

a, b and c are positive numbers.

The dextran ester copolymer obtained by the invention process possessing thermoplasticity can be made into shaped articles to be used for various purposes. It can be used as the starting material for making contact lenses as well as artifical organs or parts thereof such as artificial blood vessels, bones, kidney and cornea, denture and denturebase.

The molding method to be used can be freely chosen. For example, there is the bulk polymerization process wherein the shaped article is obtained directly by carrying out the copolymerization reaction in a mold having the form of the desired shaped article. Again, there is a method in which a cast resinous sheet obtained by the bulk polymerization process is processed by application of heat. In the case of the powdery or granular (pellet) copolymer, such molding methods as injection, extrusion and compression molding as well as casting from a solution can be employed. In addition, the monomer-polymer molding method can also be employed.

For instance, in preparing a contact lens of a copolymer obtained by the bulk polymerization process, the following procedures can be employed. First, for example, an acetic acid-methacrylic acid-acrylic acid mixed ester of dextran and methyl methacrylate are dissolved at a weight ratio of 1:1–10, and preferably 1:2–5, in a glass tube, following which the mixture is heated first for 24 hours at 30°–40° C. and then for 4 hours at 80°–100° C. in the presence of 0.001–0.01 part by weight of a polymerization initiator such as azobisisobutyronitrile to obtain a rod-shaped copolymer. After annealing the so obtained copolymer for 24 hours at 80°–90° C., it is cut into pieces having a suitable thickness, which pieces are polished and bevel-machined to obtain the contact lens.

The contact lens obtained in this manner is of the hard type, but it differs from the conventional hard contact lens in that the eyes do not become bloodshot and there is no burning feeling or fogging of the lens. Thus, the contact lens made of the invention copolymer is characterized by its possession of excellent properties making possible its use with no trouble at all.

When the ratio of methyl methacrylate/dextran ester is less than 1.0, the mechanical properties of the resulting contact lens suffer while, on the other hand, when this value is 10 or more, there is a tendency that its wearing feel becomes poor. Hence, it is preferred that a ratio in the range of from 1 to 10 be used. Further, when the acetic acid content of the dextran ester is small, the wet durability becomes poor, though its wettability with respect to tears is satisfactory. On the other hand, when the acetic acid content is too great, the wettability tends to become poor, though the strength and stability are good. Further, since the acetic acid content has an effect on the solubility of dextran ester in methyl methacrylate, a mixture in which the content of acetic acid is 10–40%, and especially 20–35%, is preferably used. Again, the contents of unsaturated acid such as, for example, methacrylic acid and acrylic acid have a bearing on the solubility of the ester in methyl methacrylate and the degree of crosslinking of the copolymer and hence its mechanical strengths, etc. Thus, when the contents of the unsaturated acids are considered from the overall standpoint, their total content should preferably be in the range of 5–20%.

The mixed dextran ester of acetic acid and acrylic acid or acetic acid and methacrylic acid can also be copolymerized in the same manner as hereinbefore described and thereafter processed into a contact lens.

Again, copolymeric powder or granular material of methyl methacrylate and a dextran ester obtained by the suspension polymerization process, preferably a copolymer of the mixed dextran ester of acetic acid and methacrylic acid, or acetic acid and acrylic acid, or acetic acid, methacrylic acid and acrylic acid, with methyl methacrylate, can also be made into a contact lens. The powder or granular material is placed in a mold where it is pressed at a pressure of 50–400 Kg/cm$^2$ while being heated at 170°–250° C. to form a product of sheet or rod form, following which it is submitted to machining operations as cutting, grinding, polishing and beveling to obtain the contact lens.

When a patient's eyes are fitted with contact lenses made in the aforementioned manner but in which the degree of esterification of the starting saturated acid from which the ester was prepared was great, there have been rare occasions of complaints about the feeling of a foreign body being present. In a case such as this, if the contact lenses are given a surface treatment for a short period of time with an alcoholic alkaline solution before or after the lenses are submitted to the beveling operation or both before and after the operation, the lenses can be worn by the patient without imparting that feeling of a foreign body being present. For example, this feeling can be eliminated by treating the lenses for usually 15–60 seconds with a mixture of water and alcohol such as methanol or ethanol (preferably of an alcohol concentration of 25–75%), in which has been dissolved an alkali such as caustic soda, sodium carbonate or sodium bicarbonate to a concentration of preferably 0.1–1.0 N. After the treatment, the lenses should be washed thoroughly with water, dilute boric acid solution and water, in the order given and, if necessary, further washed for a very short period of time with isopropyl alcohol.

Next, when a dextran ester is copolymerized with a hydroxyalkyl methacrylate, e.g., 2-hydroxyethyl methacrylate (HEMA) or 2-hydroxypropl methacrylate, a so-called hydrogel having great hygroscopicity is formed. As this hydrogel possesses a cross-linked structure, it not only is hydrophilic but also possesses superior mechanical properties, e.g., tensile strength and elasticity. Again, it can also be made transparent. Hence, the foregoing hydrogel is suitable for making artificial organs, especially soft contact lenses. As methods of making a soft contact lens, for example, that consisting of placing a dextran ester and HEMA as well as a polymerization initiator such as benzoyl peroxide and, if necessary, a suitable amount of MMA in a rotating mold and carrying out the polymerization reaction therein to obtain the product, or that consisting of polymerizing a dextran ester and HEMA into the form of a rod and then cutting, polishing, boiling and swelling this copolymer can be employed.

Further, the foregoing hydrogel cannot only be used as a carrier of medicines but also as a molecular sieve for separating substances of differing molecular weights.

The method of analyzing the dextran ester used in the present invention will now be described.

One gram of the sample is placed in 20 ml of 75% $H_2SO_4$ and by leaving it to stand for 2 hours is practically dissolved therein. Fifty ml of water is then added, after which steam distillation of the solution is carried out to obtain about 2 liters of a distillate. The following operations are then carried out in accordance with the class of the ester.

1. In the case of an ester of an unsaturated acid alone.

The distillate is submitted to redox titration to obtain the amount contained of the double bonds, after which the content of the unsaturated acid is calculated.

2. In the case of a mixed ester of a saturated acid and one class of an unsaturated acid.

The distillate is divided into two portions. One portion is then submitted to neutralization titration to obtain the total amount of the acids contained, while the other portion is submitted to redox titration to obtain the amount contained of the double bonds, after which the contents of each acid are calculated from these values.

3. In the case of a mixed ester of a saturated acid and two classes of unsaturated acids.

The distillate is divided into three portions. One of the portions is then submitted to neutralization titration to obtain the total amount of acids contained, while the second portion is submitted to redox titration to obtain the amount contained of double bonds. On the other hand, the third portion is concentrated under reduced pressure to about 300 ml, after which 30 microliters thereof is submitted to gas chromatography (column: 3mm in diameter and 2.5 meters long, packed with a packing consisting of CELITE 545 coated with 15% SILICON DC 550 and 2% stearic acid; decomposition temperature: 110° C.; carrier gas: He; detector: hydrogen flame ionization detector). The ratios of the several components are then obtained from the resulting chromatogram and a previously prepared calibration curve. The contents of each acid are calculated from the foregoing three values.

The following examples will serve to more fully illustrate the present invention.

EXAMPLE 1

A mixed solution consisting of 135 grams of acetic anhydride, 375 grams of methacrylic acid, 100 grams of acrylic acid, 20 grams of potassium acetate, 1.6 grams of hydroquinone and 500 grams of dimethylformamide was heated for 10 minutes at 115° C. with stirring. After cooling the solution, there was added thereto 24.4 grams of dextran treated in advance with a potassium acetate solution [intrinsic viscosity $[\eta]=0.174$ dl/g before treatment (measured in water at 25° C.)](10 grams calculated as dextran) followed by heating the mixture for 30 minutes at 115° C. with stirring. After cooling the resulting reaction solution, it was introduced into 3-fold amount (volume) of water, after which the precipitated white product was separated.

Next, this product was dissolved in acetone and, after filtering it, if necessary, introduced into water to obtained a precipitate. After repetition of such a purification operation, the product was dried under reduced pressure to obtain 17 grams of a white powdery product.

The so obtained product was soluble in acetone, chloroform, dimethylformamide, dimethyl sulfoxide, dioxane, methyl methacrylate and 2-hydroxyethyl methacrylate; swellable in benzene and toluene; and insoluble in water, methanol and formamide.

Acetic acid content=30.3%, methacrylic acid content=9.8% and acrylic acid content=8.2%.

Specific rotation $[\alpha]_D^{20}=+149°$ (0.3g → 50/50 formamidedimethylformamide solvent mixture 10 ml; the specific rotation of the starting dextran measured under identical conditions was $[\alpha]_D^{20}=+200°$).

Five grams of the so obtained acetic acid-methacrylic acid-acrylic acid mixed ester of dextran was dissolved in 15 grams of methyl methacrylate in an Erlenmeyer flask. After filtration of the solution with a glass filter, 0.075 gram of azobisisobutyronitrile was added and dissolved therein. The solution was then transferred to a glass tube having an inside diameter of 14 mm and, after the tube was deaired, it was sealed and heated for 24 hours in a water bath of 40° C. and thereafter for 4 hours in an air bath of 100° C. After cooling, a transparent, hard rodlike product was withdrawn from the glass tube. This product was then annealed for 24 hours in an air bath of 80° C. The weight of this product was 19.5 grams, and it was insoluble in water, methanol, acetone, chloroform, dimethylformamide, dimethyl sulfoxide, dioxane, benzene and toluene. The Vicat softening point of this product was 170° C., and its Rockwell hardness (M scale) was 101. The Vicat softening point was determined in accordance with the ASTM method D 570, while the Rockwell hardness was measured in accordance with the ASTM method D785.

EXAMPLE 2

A mixed solution of 479 grams of methacrylic acid, 135 grams of acetic anhydride, 20 grams of potassium acetate, 500 grams of dimethylformamide and 1.0 grams of hydroquinone was heated for 10 minutes at 115° C. with stirring. Next, 24.4 grams of the potassium acetate-treated dextran (corresponding to 10 grams of dextran) as used in Example 1 was added to the foregoing solution, following which the solution was heated for 30 minutes at 115°–116° C. with stirring. After cooling, the solution was treated as in Example 1 to obtain 14 grams of a white powdery product. The content of acetic acid was 32.2%, while that of methacrylic acid was 19.0%. This product was insoluble, in water, methanol and formamide but soluble in acetone, dioxane, chloroform and dimethylformamide.

Five grams of the acetic acid-methacrylic acid mixed ester of dextran obtained in this manner and 0.07 gram of azobisisobutyronitrile were dissolved in 30 grams of methyl methacrylate, after which the solution was bulk polymerized in a glass tube as in Example 1 to obtain 34 grams of a transparent rodlike product. This product was insoluble in water, methanol, acetone, dioxane, chloroform, formamide, dimethylformamide, benzene and toluene. The Rockwell hardness (M scale) of the product was 104, while its Vicat softening point was 175° C.

EXAMPLE 3

The esterification reaction was carried out under exactly identical conditions as in Example 2 but using 400 grams of acrylic acid instead of methacrylic acid to obtain 12 grams of a white powdery product. The acetic acid content was 28.1%, while the acrylic acid content was 15.1%.

This product was insoluble in water, methanol and formamide but soluble in acetone, dioxane, chloroform and dimethylformamide.

Five grams of the so obtained acetic acid-acrylic acid mixed ester of dextran was used and by operating as in Example 1 was copolymerized with 20 grams of methyl methacrylate to obtain 24 grams of a transparent rodlike product.

This product was insoluble in water, methanol, acetone, dioxane, chloroform, formamide, dimethylformamide, benzene and toluene. The product's Rockwell hardness (M scale) was 102, and its Vicat softening point was 172° C.

EXAMPLE 4

Five grams of the acetic acid-methacrylic acid-acrylic acid mixed ester of dextran obtained in Example 1 was dissolved in 50 grams of 2-hydroxyethyl methacrylate. This was followed by the addition and dissolution therein of 0.22 gram of azobisisobutyronitrile, after which the solution was deaired, placed in an optional mold, sealed and polymerized by heating for 24 hours at 40° C., followed by 4 hours at 60° C. and thereafter 2 hours at 100° C. After cooling, the product was removed from the mold. The so obtained product was transparent and hydrophilic. Its Rockwell hardness was 98.8, and its Vicat softening point was 111° C. Further, its water absorption was 17.9% (ASTM D 570).

EXAMPLE 5

A mixed solution of 400 grams of acrylic acid, 135 grams of acetic anhydride, 100 grams of potassium acetate, 500 grams of toluene and 1.0 grams of hydroquinone was refluxed for 10 minutes. Next, 24.4 grams of the potassium acetate-treated dextran (corresponding to 10 grams of dextran) used in Example 1 was added, and the reaction was carried out for 30 minutes at 115° C. with stirring. After cooling, the reaction solution was introduced into water. Next, while adding lumps of ice, the pH of the solution was adjusted to 4.0 with a caustic soda solution, and the product was separated. The product was washed with a large amount of water, filtered off and dried under reduced pressure to obtain 11 grams of a white powdery product. The content of acetic acid of this product was 21.2%, while that of acrylic acid was 10.6%. This product was insoluble in water, methanol, acetone and formamide but soluble in dioxane, chloroform and dimethylformamide.

Five grams of the so obtained acetic acid-acrylic acid mixed ester of dextran was dissolved in 500 ml of dioxane in a 4-necked flask, following which 50 grams of methyl methacrylate was added dropwise while introducing nitrogen. 0.55 grams of benzoyl peroxide was then added, and the inside temperature was raised to 65° C., at which temperature the reaction was carried out for 10 hours. After cooling, the reaction solution was introduced into methanol, and the precipitate was separated by filtration, washed in methanol and dried under reduced pressure. The dried product was then extracted by this Soxhlet method using acetone, after which the residue was dried to obtain 45 grams of a white product. This product was insoluble in water, methanol, formamide and dimethylformamide.

EXAMPLE 6

Five grams of the acetic acid-methacrylic acid-acrylic acid mixed ester of dextran obtained in Example 1 was dissolved in 50 grams of methyl methacrylate in a 3-necked flask, after which 0.11 grams of azobisisobutyronitrile was added and dissolved therein. When this solution was heated for 2 hours at 65° C. with stirring, a viscous solution was obtained. This solution was immediately cooled and introduced into a mold prepared by bringing together two sheets of glass. After closing the mold, it was heated in an air bath for 10 hours at 45° C., then 2 hours at 60° C., and thereafter 2 hours at 100° C. After cooling the mold, the product was taken out. Thus was obtained a transparent product of sheet form. This product had a Rockwell hardness (M scale) of 100 and a Vicat softening point of 170° C.

EXAMPLE 7

The rodlike copolymer obtained in Example 1 was cut with a lathe rotating at 2000 rpm. A prescribed curvature was then established for the cut pieces by concavo-convex machining the pieces at the same rpm. Next, these pieces were fitted into pit dishes of a lens polisher and polished under the conditions of an under part rotation of 200 rpm and upper part rotation of 15 rpm. Then the edge of the lenses were beveled with a bevelling machine to obtain the contact lenses.

The following dyeing test was conducted for examining the wetting property of the surface of the contact lens made in the manner described above. The contact lens was treated in an aqueous solution containing 3% of SUMINAL MILLING RED RS, 0.02% of glacial acetic acid and 0.1% of ammonium acetate. As control, a commercially available hard contact lens was submitted to the same treatment. When the dyeabilities of the two were compared, the contact lens of the present invention was dyed to a red color, whereas the control lens was not dyed at all, thus demonstrating that in the case of the contact lens of the present invention there is an increase in the hydrophilicity of the lens surface and an improvement in its wetting property.

Further, when for testing the durability of the invention contact lens it was immersed in an isotonic salt solution and, after holding it therein for 120 days at 25° C., taken out and its base curve was measured with a contact gauge manufactured by Leitz Company, while its power was measured with a lens meter manufactured by Topcon Company, Japan, there was no change in either the base curve or the power. Thus, the durability was found to be satisfactory.

Next, a clinical test was conducted using the invention contact lens. A patient having the following vision and unable to use the commercially available hard contact lens due to eye pains when fitted therewith was fitted with the following contact lens obtained in this Example.

| Vision. | | | | |
|---|---|---|---|---|
| Left eye vision | | 0.04 (1.0×S−6.25) | | |
| Right eye vision | | 0.04 (1.0×S−6.25) | | |
| Contact lenses used. | | | | |
| | Base curve | Power | Size | Corrected vision |
| Left eye | 730 | −4.50 | 8.8 | 1.0 |
| Right eye | 730 | −4.75 | 8.8 | 1.0 |

When observations were carried out over a period of 180 days, it was found that even though the lenses were worn 12 hours per day there were no complaints of unpleasantness in either eye, normal vision was restored and there was no change at all in the base curve as well as power of the contact lenses.

EXAMPLE 8

Contact lenses were obtained by operating as in Example 7, using the rodlike copolymer obtained in Example 2.

A clinical test was conducted using the so obtained contact lenses. A patient having the following vision and unable to use the commercially available hard contact lenses due to the eyes becoming bloodshot when fitted therewith was fitted with the following contact lenses obtained in this Example.

| Vision. | | | | |
|---|---|---|---|---|
| Left eye vision | | 0.02 (1.0 × S − 4.50) | | |
| Right eye vision | | 0.02 (1.0 × S − 4.00) | | |
| Contact lenses used. | | | | |
| | Base curve | Power | Size | Corrected vision |
| Left eye | 820 | −3.0 | 8.8 | 1.0 |
| Right eye | 800 | −4.0 | 8.8 | 1.0 |

While the lens could be worn with no trouble in the case of the left eye, the patient complained of some unpleasantness in the case of the right eye.

So, the contact lens fitted to the right eye was removed and, after immersion for 20 seconds in a solution obtained by dissolving caustic soda in 30% aqueous methanol to a concentration of 0.25 N, was thoroughly washed in water, 0.5 N aqueous boric acid solution and water, in the order given, and finally in isopropyl alcohol.

When the so treated and washed lens was again worn in the right eye, there was no complaint at all of unpleasantness.

Further, even after the lenses were worn for 180 days, there was no abnormality as to the vision and the wearing feel, and there was no change in the base curve and power of the contact lenses.

We claim:

1. A dextran ester-olefin compound copolymer comprising a unit derived from a dextran ester of the following formula (1)

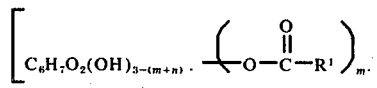
(1)

wherein $R^1$ is a $C_2$–$C_{18}$ organic radical having the

bond derived from the $>C=C<$ bond of an unsaturated acid, $R^2$ is a $C_1$–$C_{18}$ alkyl radical, $m$ is a positive number having a value of $O<m \leqq 3$, $n$ is a positive number having a value of $O \leqq n<3$, with the proviso that $m + n<3$, and $x$ is a positive number having a value of 5 or more; and a unit derived from a polymerizable olefin compound of the following formula (2)

(2)

wherein $R^3$, $R^4$ and $R^5$ are each selected from the group consisting of hydrogen and $CH_3$ and $R^6$ is a member of the group consisting of

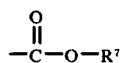

[where $R^7$ is a member of the class consisting of hydrogen, $C_1$–$C_{18}$ alkyl radicals, cyclohexyl radical, lower alkyl-substituted cyclohexyl radical, $C_1$–$C_8$ hydroxyalkyl radicals, —N($R^{10}$)$_2$ where the two $R^{10}$'s which may be the same or different are members of the group consisting of hydrogen and a $C_1$–$C_4$ alkyl radical, $C_1$–$C_8$ aminoalkyl radicals, $C_1$–$C_8$ dialkylaminoalkyl radicals, glycidyl radical, tetrahydrofuran radical, lower alkyl-substituted tetrahydrofuran radical, benzyl radical and (CH$_2$CH$_2$O)$_y$CH$_2$CH$_2$OH radical where $y$ is a positive integer from 1 to 10];

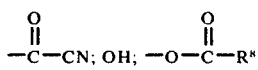

where $R^8$ is a $C_1$–$C_8$ alkyl radical;

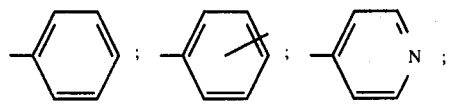

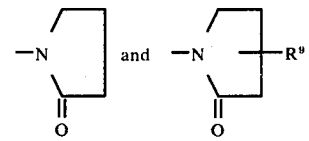

where $R^9$ is a lower alkyl radical.

2. A process for preparing a dextran ester-olefin compound compolymer which comprises reacting in the presence and/or absence of a polymerization initiator a dextran ester of the following formula (1')

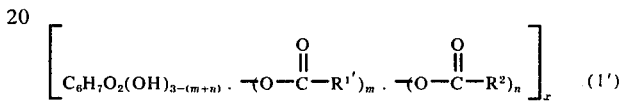
(1')

wherein $R^{1'}$ is a $C_2$–$C_{18}$ organic radical having the $>C=C<$ bond, $R^2$ is a $C_1$–$C_{18}$ alkyl radical, $m$ is a positive number having a value of $O<m \leqq 3$, $n$ is a positive number having a value of $O \leqq n<3$, with the proviso that $m+n \leqq 3$, and $x$ is a positive number having a value of 5 or more; with a polymerizable olefin compound of the formula (2')

(2')

wherein $R^3$, $R^4$ and $R^5$ are each selected from the group consisting of hydrogen and $CH_3$, and $R^6$ is a member of the group consisting of

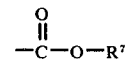

[where $R^7$ is a member of the class consisting of hydrogen, $C_1$–$C_{18}$ alkyl radicals, cyclohexyl radical, lower alkyl-substituted cyclohexyl radical, $C_1$–$C_8$ hydroxyalkyl radicals, —N($R^{10}$)$_2$ where the two $R^{10}$'s which may be the same or different are members of the group consisting of hydrogen and a $C_1$–$C_4$ alkyl radical, $C_1$–$C_8$ aminoalkyl radicals, $C_1$–$C_8$ dialkylaminoalkyl radicals, glycidyl radical, tetrahydrofuran radical, lower alkyl-substituted tetrahydrofuran radical, benzyl radical and (CH$_2$CH$_2$O)$_y$CH$_2$CH$_2$OH radical where $y$ is a positive integer from 1 to 10];

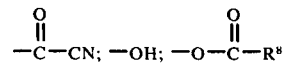

where $R^8$ is a $C_1$–$C_8$ alkyl radical;

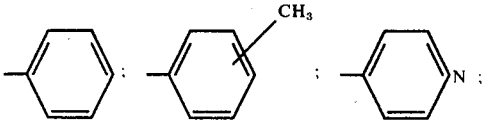

-continued

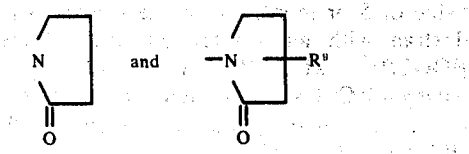

where $R^9$ is a lower alkyl radical.

3. A shaped article of a dextran ester-olefin compound copolymer comprising a unit derived from a dextran ester of the following formula (1)

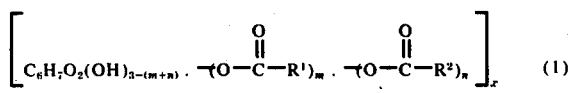  (1)

wherein $R^1$ is a $C_2$–$C_{18}$ organic radical having the

bond derived from the >C=C< bond of an unsaturated acid, $R^2$ is a $C_1$–$C_{18}$ alkyl radical, $m$ is a positive number having a value of $0 < m \leq 3$, $n$ is a positive number having a value of $0 \leq n < 3$, with the proviso that $m + n \leq 3$, and $x$ is a positive number having a value of 5 or more; and a unit derived from a polymerizable olefin compound of the following formula (2)

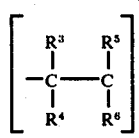  (2)

wherein $R^3$, $R^4$ and $R^5$ are each selected from the group consisting of hydrogen and $CH_3$, and $R^6$ is a member of the group consisting of

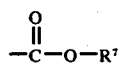

[wherein $R^7$ is a member of the class consisting of hydrogen, $C_1$–$C_{18}$ alkyl radicals, cyclohexyl radical, lower alkyl-substituted cyclohexyl radical, $C_1$–$C_8$ hydroxyalkyl radicals, —N($R^{10}$)$_2$ where the two $R^{10}$'s which may be the same or different are members of the group consisting of hydrogen and a $C_1$–$C_4$ alkyl radical, $C_1$–$C_8$ aminoalkyl radicals, $C_1$–$C_8$ dialkylaminoalkyl radicals, glycidyl radical, tetrahydrofuran radical, lower alkyl-substituted tetrahydrofuran radical, benzyl radical and (CH$_2$CH$_2$O)$_{\overline{y}}$CH$_2$CH$_2$OH radical where $y$ is a positive integer from 1 to 10];

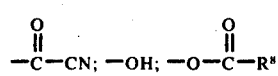

where $R^8$ is a $C_1$–$C_8$ alkyl radical;

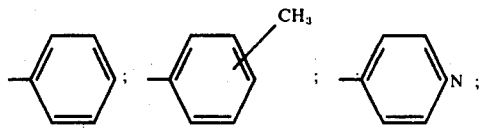

where $R^9$ is a lower alkyl radical.

4. A shaped article of claim 3 wherein said shaped article is a contact lens.

5. A process for preparing a shaped article of a dextran ester-olefin compound copolymer which comprises reacting in a mold in the presence and/or absence of a polymerization initiator a dextran ester of the following formula (1')

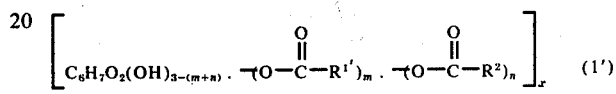  (1')

wherein $R^{1'}$ is a $C_2$–$C_{18}$ organic radical having the >C=C< bond, $R^2$ is a $C_1$–$C_{18}$ alkyl radical, $m$ is a positive number having a value of $0 < m \leq 3$, $n$ is a positive number having a value of $0 \leq n < 3$, with the proviso that $m + n \leq 3$, and $x$ is a positive number having a value of 5 or more; with a polymerizable olefin compound of the following formula (2')

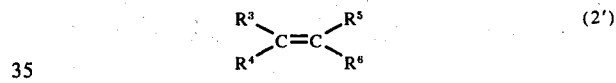  (2')

wherein $R^3$, $R^4$ and $R^5$ are each selected from the group consisting of hydrogen and $CH_3$, and $R^6$ is a member of the group consisting of

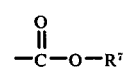

[where $R^7$ is a member of the class consisting of hydrogen, $C_1$–$C_{18}$ alkyl radicals, cyclohexyl radical, lower alkyl-substituted cyclohexyl radical, $C_1$–$C_8$ hydroxyalkyl radicals, —N($R^{10}$)$_2$ where the two $R^{10}$'s which may be the same or different are members of the group consisting of hydrogen and a $C_1$–$C_4$ alkyl radical, $C_1$–$C_8$ aminoalkyl radicals, $C_1$–$C_8$ dialkylaminoalkyl radicals, glycidyl radical, tetrahydrofuran radicals, lower alkyl-substituted tetrahydrofuran radical, benzyl radical and (CH$_2$CH$_2$O)$_{\overline{y}}$CH$_2$CH$_2$OH radical where $y$ is a positive integer from 1 to 10];

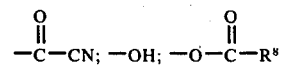

where $R^8$ is a $C_1$–$C_8$ alkyl radical;

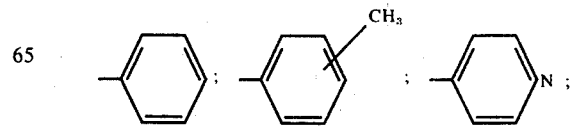

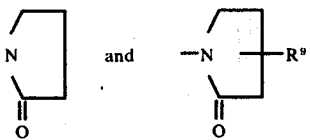

where $R^9$ is a lower alkyl radical.

6. A dextran ester of the following formula (1''')

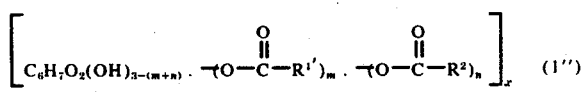

wherein $R^{1'}$ is a $C_2$-$C_{18}$ organic radical having the $>C=C<$ bond, $R^2$ is a $C_1$-$C_{18}$ alkyl radical, $m$ is a positive number having a value of $0<m<3$, $n$ is a positive number having a value of $0<n<3$, with the proviso that $m+n \leq 3$, and $x$ is a positive number having a value of 5 or more.

7. A process for preparing dextran ester of the following formula (1''')

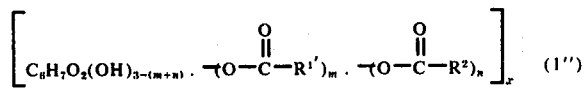

wherein $R^{1'}$ is a $C_2$-$C_{18}$ organic radical having the $>C=C<$ bond, $R^2$ is a $C_1$-$C_{18}$ alkyl radical, $m$ is a positive number having a value of $0<m<3$, $n$ is a positive number having a value of $0<n<3$, with the proviso that $m+n \leq 3$, and $x$ is a positive number having a value of 5 or more, said process comprising reacting dextran with an unsaturated acid of the formula $HOOCR^{1'}$ where $R^{1'}$ is a $C_2$-$C_{18}$ organic radical having a $>C=C<$ bond and a compound selected from the group consisting of a saturated acid of the formula $HOOCR^2$ where $R^2$ is a $C_1$-$C_{18}$ alkyl radical and the acid anhydride thereof, in the presence of an acid catalyst.

8. A process for preparing a dextran ester of the following formula (1''')

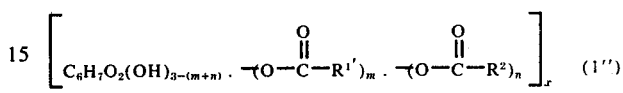

where $R^{1'}$ is a $C_2$-$C_{18}$ organic radical having the $>C=C<$ bond, $R^2$ is a $C_1$-$C_{18}$ alkyl radical, $m$ is a positive number having a value of $0<m<3$, $n$ is a positive number having a value of $0<n<3$, with the proviso that $m+n \leq 3$, and $x$ is a positive number having a value of 5 or more, said process comprising reacting dextran with a compound selected from the group consisting of an unsaturated acid of the formula $HOOCR^{1'}$ where $R^{1'}$ is a $C_2$-$C_{18}$ organic radical having the $>C=C<$ bond and the acid anhydride and acid halides thereof and a compound selected from the group consisting of a saturated acid of the formula $HOOCR^2$ where $R^2$ is a $C_1$-$C_{18}$ alkyl radical and the acid anhydride and acid halides thereof, in a nonacidic liquid medium under basic conditions.

* * * * *

UNITED STATES PATENT OFFICE
CERTIFICATE OF CORRECTION

Patent No. 4,032,488   Dated June 28, 1977

Inventor(s) HOKKOKU, ET AL.

It is certified that error appears in the above-identified patent and that said Letters Patent are hereby corrected as shown below:

Claim 2, column 20, line 65; Claim 3, column 21, line 65; and Claim 5, column 22, line 65; delete the third benzene ring in each instance and insert the following therefor:

Signed and Sealed this

Fourth Day of October 1977

[SEAL]

Attest:

RUTH C. MASON
*Attesting Officer*

LUTRELLE F. PARKER
*Acting Commissioner of Patents and Trademarks*